(12) United States Patent
Otte et al.

(10) Patent No.: US 8,773,087 B2
(45) Date of Patent: Jul. 8, 2014

(54) POWER SUPPLY CIRCUIT HAVING SWITCHED CAPACITOR UNITS

(75) Inventors: Rob Otte, Eindhoven (NL); Henricus Marie Peeters, Eindhoven (NL); Vincent Gerardus Petrus Cornelis Van Den Broek, Oss (NL); Carsten Deppe, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 348 days.

(21) Appl. No.: 12/741,052

(22) PCT Filed: Nov. 6, 2008

(86) PCT No.: PCT/IB2008/054626
§ 371 (c)(1),
(2), (4) Date: May 3, 2010

(87) PCT Pub. No.: WO2009/060400
PCT Pub. Date: May 14, 2009

(65) Prior Publication Data
US 2010/0253302 A1  Oct. 7, 2010

(30) Foreign Application Priority Data
Nov. 7, 2007  (EP) .................................. 07120152

(51) Int. Cl.
*G05F 1/577* (2006.01)
(52) U.S. Cl.
USPC .......... 323/267; 307/29; 315/297; 315/185 R; 315/192
(58) Field of Classification Search
USPC ......... 323/209, 222–225, 229, 266, 268, 271, 323/272, 282, 350, 351; 307/24, 29, 32, 34, 307/51, 85; 315/125, 192, 224, 246, 291, 315/297, 307
See application file for complete search history.

(56) References Cited

U.S. PATENT DOCUMENTS 5,608,614 A * 3/1997 Ohnishi et al. ................. 363/60
6,075,295 A    6/2000 Li
(Continued)

FOREIGN PATENT DOCUMENTS

WO    2007039862 A2    4/2007

*Primary Examiner* — Adolf Berhane
*Assistant Examiner* — Gustavo Rosario Benitez
(74) *Attorney, Agent, or Firm* — Yuliya Mathis

(57) ABSTRACT

The invention relates to a power supply circuit (10) and methods for supplying electrical power to at least one load output. The circuit comprises a main power supply unit (12) with a voltage input (14), a main switching element (26) and a reactive element (28). The switching element (26) is controllable to deliver an output voltage or current (I out). Output units (20a, 20b, 20c) with load outputs are connected to a main power supply unit (12). In order to drive loads connected to the load outputs, e.g. LEDs, OLEDs or laser diodes, with exact pulses, each output unit (20a, 20b, 20c) has a load switching element (38) to connect or disconnect the main power supply unit (12) to or from the load output. There are further provided switched capacitor units (34), each with a capacitor (C) and a capacitor switching element (40). The capacitor units may be operated such that the capacitors remain essentially charged at different voltage levels. According to a second aspect of the invention, each output unit (20a, 20b, 20c) has a switched capacitor unit (34) with a capacitor (C) and a capacitor switching element (40) connected to the load output. The load switching element (38) and the capacitor switching elements (40) are controlled synchronously.

8 Claims, 8 Drawing Sheets

(56) References Cited

U.S. PATENT DOCUMENTS

| | | |
|---|---|---|
| 6,150,802 A | 11/2000 | Andrews |
| 6,369,525 B1 | 4/2002 | Chang et al. |
| 6,437,545 B2 | 8/2002 | Sluijs |
| 6,636,022 B2 | 10/2003 | Sluijs |
| 6,690,146 B2 | 2/2004 | Burgyan et al. |
| 7,009,313 B1 * | 3/2006 | Parramon et al. ............... 307/85 |
| 2002/0093315 A1 * | 7/2002 | Sluijs ........................... 323/267 |
| 2003/0025120 A1 | 2/2003 | Chang |
| 2004/0012380 A1 | 1/2004 | Vincent et al. |
| 2004/0066154 A1 | 4/2004 | Ito et al. |
| 2004/0201281 A1 | 10/2004 | Ma et al. |
| 2005/0017699 A1 * | 1/2005 | Stanley ........................ 323/282 |
| 2005/0116665 A1 | 6/2005 | Colby et al. |
| 2006/0033482 A1 * | 2/2006 | Florence et al. ............. 323/267 |
| 2007/0262724 A1 * | 11/2007 | Mednik et al. ................ 315/125 |
| 2008/0116818 A1 * | 5/2008 | Shteynberg et al. .......... 315/192 |

* cited by examiner

POWER SUPPLY CIRCUIT HAVING SWITCHED CAPACITOR UNITS

FIELD OF THE INVENTION

The present invention relates to power supply circuits and methods for supplying electrical power to at least one load output. More specifically, the invention relates to circuits and methods for using a switched mode power supply unit to drive loads in a way that achieves stable, exact current or voltage output well suited e.g. for loads driven in a pulsed manner.

BACKGROUND OF THE INVENTION

A plurality of switched mode power supply topologies are known to the skilled person including the buck converter, the boost converter, the fly back converter, the buck boost converter and others. These circuits convert a DC input voltage into a desired output voltage by using at least one main switching element (which may be realized in a plurality of ways, as known to the skilled person, e.g. as a field effect transistor FET) and least one reactive element (i.e. a circuit element which can at least temporarily store energy, usually implemented as an inductor). In operation, the main switching element is continuously switched in a controlled manner, so that the input voltage is converted into an output voltage of desired voltage level.

It is known to use a switched mode power supply to simultaneously drive a plurality of loads. These loads may be connected to the power supply e.g. in parallel fashion.

An example of an application where multiple loads are to be supplied are lighting and display applications e.g. for video screens and projectors, that employ multiple light sources. These light sources, which are connected to the power supply circuit as loads may be e.g. LED, OLED, or laser diodes, e.g. of different color. It should be noted that in the present context the light sources may be single elements, such as single LEDs, but that the term "light source" is also used for any array of single lighting elements, which may be connected e.g. in series or parallel. It is known to provide accurate dimming of the light sources by driving them in a pulsed manner. However, power supply circuits suited for use in display applications need to provide quite exact pulse shapes in order to obtain a correspondingly exact result. This is especially true for time-sequential display applications, where the light sources are driven rapidly in time-sequential manner to achieve color and intensity control, and/or the light is additionally modulated by a display device.

For driving light sources in a pulsed manner, the required voltage or current (pulse height) may be fixed for one light source, but will differ between different light sources, e.g. of different color. Also, for some display applications it is known to drive the same light source sequentially with pulses of different height (i.e. voltage or current level).

To drive the loads as described above, it is possible to provide a single, dedicated switched mode power supply for each load and each required voltage output level. However, the corresponding outlay is enormous.

WO-A-2007-039862 describes a driver circuit arrangement for driving a plurality of individually switchable electrical subsystems, such as arrangements of LEDs. The subsystems are all connected in parallel to the same switched mode power converter. Each subsystem is comprised of an LED (the load) connected in parallel to a capacitor with a controllable subswitch for connecting the load to the capacitor. Further, each subsystem comprises a load switch which connects or disconnects the subsystem to/from the power converter. In operation, an external control unit selects the subsystems to be supplied with energy by closing the corresponding load switch. In contrast to prior circuits which do not have a subswitch between the capacitor and the load, it is then possible to control the load, e.g. in pulse width modulation mode by controlling the subswitch independently from the load switch.

If multiple loads requiring different voltage levels are driven by the same switched mode power supply circuit, or if at least one load requires different voltage levels at different times, then the problem of voltage mismatch may occur: after supplying a first voltage level for a first pulse, the circuit will require some time to supply a different voltage level for a second, following pulse. This will lead to distortion of the pulse shape and subsequently worsened control results.

SUMMARY OF THE INVENTION

It is an object of the present invention to provide a power supply circuit and a method for supplying electrical power well suited for driving loads in pulses with exact pulse shape.

According to the invention, this is on one hand solved by a power supply circuit according to embodiments in which an output unit includes multiple switched capacitor units. This aspect of the invention is particularly advantageous to allow the use of a single switched mode converter for driving at least one load with different output levels.

On the other hand, this is solved by a power supply circuit according to embodiments in which the power supply circuit includes multiple output units. This aspect of the invention allows using a single switched mode converter for a plurality of loads.

Thus, both aspects of the invention deal with avoiding voltage mismatch in driving a load connected to a converter in a sequentially pulsed manner. While each aspect of the invention is advantageous separately, it should be emphasized that the aspects may well be combined, e.g. if among a plurality of loads one (or several) are required to be driven at subsequently differing voltage levels.

According to the first aspect of the invention, there is provided a main power supply unit with a voltage input, at least one main switching element and at least one reactive element. This main power supply unit is a switched mode converter, where the switching element is controllable to deliver an output voltage or current. As known to the skilled person, the main power supply unit may comprise any of the known switched mode converter topologies and modes of operations.

There is at least one output unit connected to the main power supply unit. The output unit comprises a load output, to which a load, such as e.g. an LED, OLED or laser diode may be connected. The output unit further comprises a load switching element connected to the load output to connect the main power supply unit to the load output, i.e. to switch the output voltage delivered by the converter on or off at the load output. While in principal other configurations could be used, it is preferred for the load switching element to be connected to the main power supply unit in series with the load output.

According to the first aspect of the invention, the output unit further comprises a first and second switched capacitor unit. Each switched capacitor unit comprises at least a capacitor and a corresponding switching element. Again, while other configurations are possible, it is preferred for the switching element to be connected in series to the capacitor, and for the switched capacitor units to be connected in parallel to the load output and/or the load switching element.

The switched capacitor units allow a mode of operation where the capacitor remains essentially charged to a pre-defined voltage level while it is not active, i.e. connected to the load output. If reconnected, the charged capacitor may then serve as a buffer element at the load output, instantaneously providing the desired voltage level upon activation of the output unit.

This is especially advantageous to drive loads such as LEDs, OLEDs or laser diodes in a pulsed manner, e.g. in display applications. The pre-charged capacitor avoids otherwise necessary rise times at the start of the pulse and thus provides for very exact control, particularly in drive schemes where the voltage level remains constant during a pulse, or where at least the voltage at the end of a pulse is essentially equal to the voltage at the start of the pulse.

In the first aspect of the invention, there are provided at least two switched capacitor units, which are both connected to the same load output, preferably in parallel. Since each capacitor unit is individually switchable by its capacitor switching element, they may be selectively activated. Thus, by keeping the inactive capacitor units substantially charged at different voltage levels, the same load output may be operated to instantaneously deliver exact pulsed outputs as described above, but at two different voltage levels.

It should be noted that in the present context the terms "essentially" charged and "essentially" constant or equal relate to the fact that there may of course occur slight variations in the voltage—e.g. instantaneously after switching—but that it is preferred for the capacitors to remain charged, at least while disconnected from the load, to more than 90%, and particularly preferable 99% or more of the mean voltage during operation, i.e. during a voltage pulse.

In the inventive method according to the first aspect of the invention the switching elements are operated to provide the load output with a required output voltage level. If a first voltage is required, then the first capacitor may be connected in parallel to the load output, and if a second output voltage level is required, the second capacitor will be connected in parallel to the load output. At the same time, it is preferred to operate the main power supply unit to deliver an output current corresponding to the desired output voltage level so that at the start of a pulse the capacitor delivers the desired voltage, but with the minimal necessary delay the converter then continues to deliver the voltage.

Further, it is preferred that a capacitor currently not connected to the load output be switched off to essentially avoid discharge.

According to a first aspect of the invention there is thus provided a circuit and operation method well suited to deliver exact current pulses at different voltage levels to the load output. There are a number of possible advantageous developments of the basic idea, to which the dependent claims relate.

It is possible to connect not only one, but several output units to the main power supply unit. One or more of the further output units may comprise at least one switched capacitor unit, and it is also possible to provide further output units with two or more switched capacitor units. For example, there may be in total three loads present which are light sources of different color, e.g. red, green and blue, which are operated in sequential pulses, where the pulse height is different for the three light sources. Additionally, one light source—the one connected to the output unit with two switched capacitor units—may be driven with sequential pulses at different voltage levels. A corresponding driving scheme and circuit will be described in detail with regard to the preferred embodiment of the invention.

It is preferred that the circuit comprises control means to control the switching elements, i.e. main switching element, load switching element and capacitor switching elements. Such a control means may be a single unit responsible for all switches, but it is also possible to divide the functionality of the control means between several units, e.g. one controlling the main switching element and another controlling load switching elements and capacitor switching elements. The units used as control means may be dedicated electric circuits, or a microcontroller or microprocessor programmed for the control task.

It is especially preferred for the load switching element and the capacitor switching elements to be controlled synchronously, i.e. that upon activation of a load output both the corresponding load switching element and capacitor switching element are activated, and that upon deactivation both the load switching element and capacitor switching element are deactivated. By this operation, the inactive capacitor remains essentially charged to the desired voltage level, because no discharge occurs if it is switched off during deactivation of the output unit. In case of plural switched capacitor units per output unit, the load switching element is controlled synchronously with a selected one of the first and second capacitor switching elements, i.e. either one or the other.

According to the second aspect of the invention, there is also provided a main power supply unit with a voltage input, at least one main switching element and at least one reactive element. This main power supply unit is a switched mode converter, where the switching element is controllable to deliver an output voltage or current. As known to the skilled person, the main power supply unit may comprise any of the known switched mode converter topologies and modes of operations.

According to the second aspect, there are a plurality of output units connected to the main power supply unit. The output unit comprises a load output, to which a load, such as e.g. an LED, OLED or laser diode may be connected. The output units further each comprise a load switching element connected to the load output to connect the main power supply unit to the load output, i.e. to switch the output voltage delivered by the converter on or off at the load output. While in principal other configurations could be used, it is preferred for the load switching element to be connected to the main power supply unit in series with the load output.

According to the second aspect of the invention, each output unit further comprises a switched capacitor unit. The switched capacitor unit comprises at least a capacitor and a corresponding switching element. Again, while other configurations are possible, it is preferred for the switching element to be connected in series to the capacitor, and for the switched capacitor units to be connected in parallel to the load output and/or the load switching element.

According to the second aspect of the invention, the power supply circuit comprises a control means to control the load switching elements and the capacitor switching elements of the different output units such that in each output unit the load switching element is controlled synchronously with the capacitor switching element, i.e. that upon activation of a load output both the corresponding load switching element and capacitor switching element are activated, and that upon deactivation both the load switching element and capacitor switching element are deactivated. By this operation, the inactive capacitor remains essentially charged to the desired voltage level, because no discharge occurs if it is switched off during deactivation of the output unit.

This ensures that in each output upon activation of the load (by connecting the load to the output voltage delivered from the main power supply unit) the capacitor is connected to buffer the output voltage and instantaneously deliver an output voltage at the desired output voltage level, even if the main power supply unit may take some time to adjust to the desired voltage level. On the other hand, by simultaneously switching off both switching elements, it is ensured that the capacitor remains essentially charged to the desired voltage level.

Also for the second aspect, it is possible to connect not only one, but several output units to the main power supply unit as described above. Also the control means may be implemented as described above.

According to the second aspect of the invention there is thus provided a circuit and operating method well suited to drive a plurality of loads with exact current pulses.

BRIEF DESCRIPTION OF THE DRAWINGS

The above and other objects, features and advantages of the present invention will become apparent from the following description of preferred embodiments, in which.

DETAILED DESCRIPTION OF EMBODIMENTS

Figure 1:
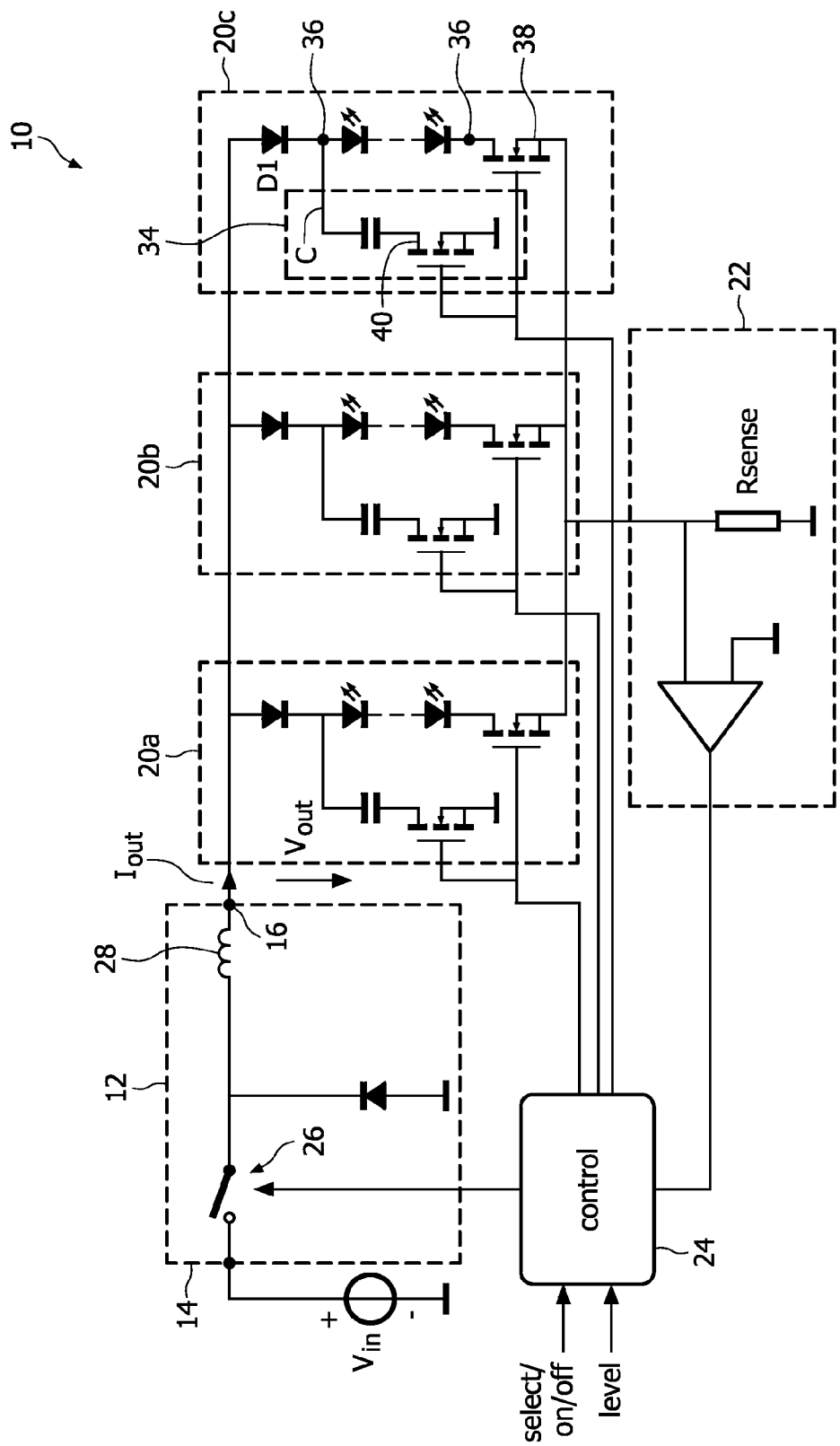
FIG. 1 shows as a first embodiment of the invention a circuit diagram of a power supply circuit with multiple outputs connected to a buck converter.

FIG. 1 shows a circuit diagram of a power supply circuit 10. The circuit 10 comprises a main power supply unit 12 which converts a DC input voltage $V_{in}$, received at a voltage input 14 into an output current $I_{out}$ corresponding to a DC output voltage $V_{out}$ at an output 16.

A plurality of output units—in the shown example three output units 20a, 20b, 20c—are connected in parallel to the voltage output 16 of the power supply unit 12.

The circuit further comprises a sensing circuit 22 for sensing a current and providing a corresponding feedback signal to a control unit 24.

Figure 3:
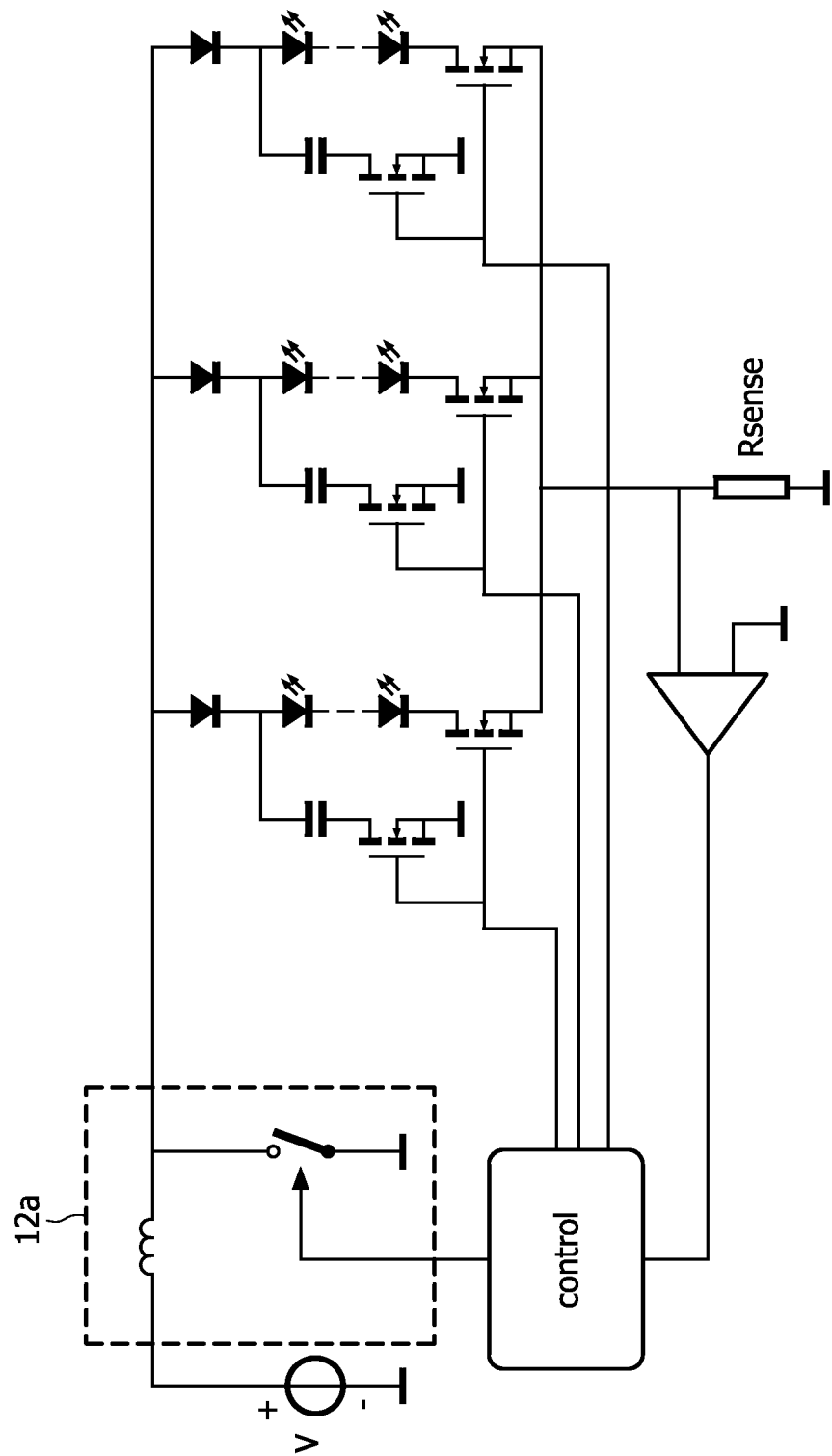
FIG. 3 shows as a second embodiment of the invention a circuit diagram of a power supply circuit with three outputs connected to a boost converter.
Figure 4:
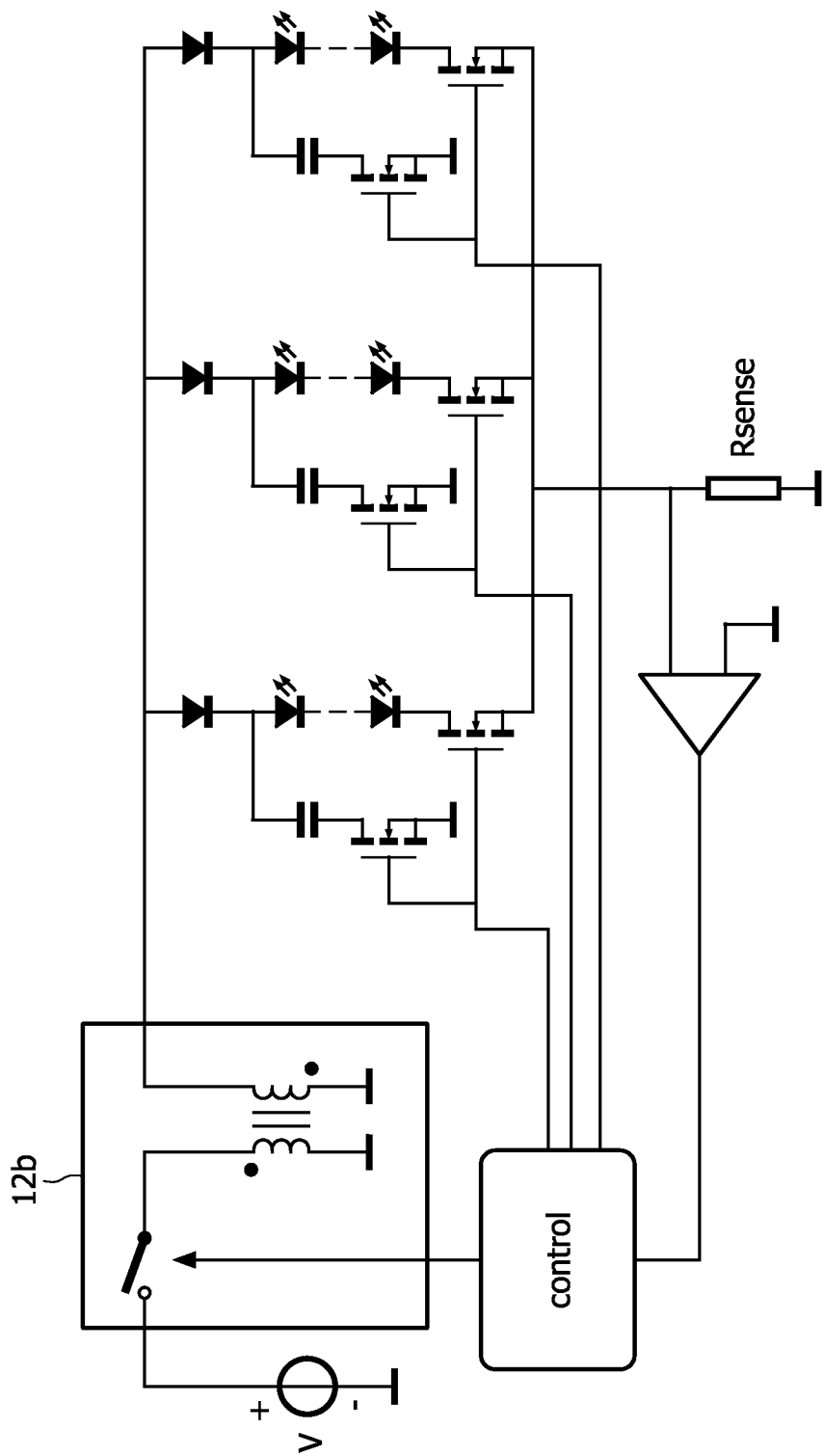
FIG. 4 shows as a third embodiment of the invention a circuit diagram of a power supply circuit with three outputs connected to a fly-back converter.

The main power supply unit 12 shown in the first example is a buck converter. Alternatively, a different type of switched mode power supply topology could be used, such as a boost converter 12a (FIG. 3), a fly-back converter 12b (FIG. 4) or one of the further known topologies of switched mode converters.

Within such switched mode converters, there are one or more switches, such as a main switching element 26 in the example of FIG. 1 and a reactive element, such as the series inductor 28 in the example of FIG. 1. By continuously switching on or off the main switching element 26, the DC input voltage $V_{in}$ is converted into an output current $I_{out}$, the value of which depends on the switching of the main switching element 26.

It should be noted that in the present example of a buck converter the output capacitor usually present in this converter topology is here included in the output units, as will be explained. Thus, the converter 12 may be operated to deliver an output current $I_{out}$ which will vary over time in accordance with the switching cycles of the converter 12. Control of the converter 12 may be effected as control of a time average value of the current $I_{out}$, which, in conjunction with the output, will lead to the output voltage $V_{out}$.

In the example of FIG. 1, switching of the main switching element 26 is effected by the central control unit 24 in response to a feedback signal received from the sensing circuit 22.

Since the different switched mode converter topologies are well known to the skilled person, further details regarding operation and control of the different possible implementations for a main power supply unit 12 will not be discussed.

The output unit 20a, 20b, 20c are in the first example identical. An auxiliary diode D1 is connected to the output 16 of converter 12. Connected to the auxiliary diode D1 are in parallel a switched capacitor unit 34 and in series connection a load output 36 and a load switching element 38, in the shown example implemented as an FET.

The switched capacitor unit 34 is comprised of a series connection of a capacitor C and a capacitor switch 40, in the present example also implemented as an FET.

Connected to the load output 36 is, in the present example, an array of LEDs.

The circuit 10 is a power supply unit for three of these LED arrays acting as red, green and blue light sources in a display application, e.g. for a video screen or a projector. The light sources are driven in very short consecutive pulses.

Figure 8A:
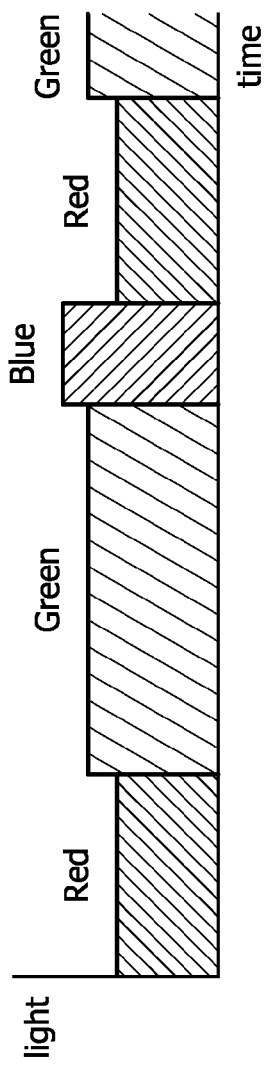
FIG. 8a a timing diagram showing a sequence of pulses for driving a red, green and blue light source in sequential current pulses according to a first driving scheme (fixed level per color)
Figure 8B:
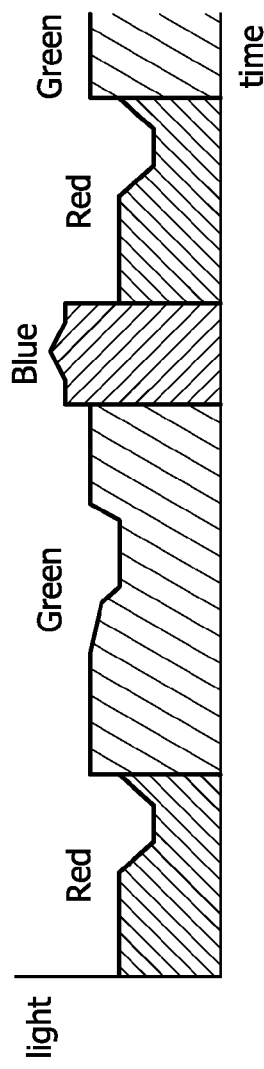
FIG. 8b a timing diagram showing a sequence of pulses according to a second driving scheme (pulse level modulation)
Figure 8C:
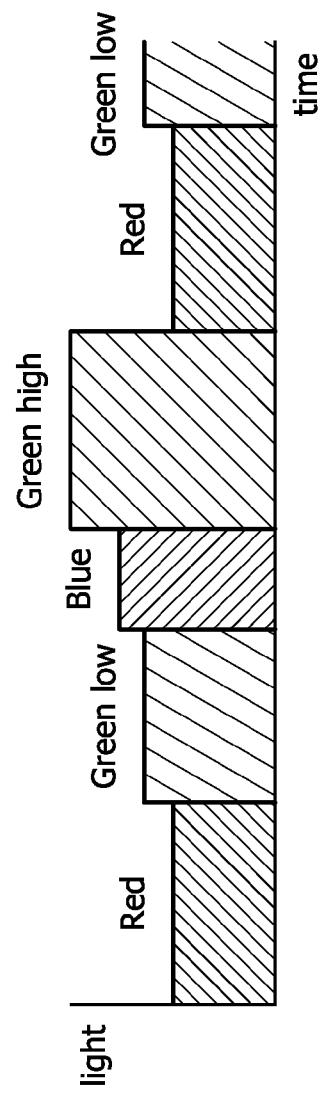
FIG. 8c a timing diagram showing a sequence of pulses according to a third driving scheme (fixed level per color with two-level output for one color).

FIG. 8a-8c shows three examples of possible driving schemes. In the first example of a driving scheme shown in FIG. 8a, there are provided consecutively pulses for the red, green and blue light source. The pulse height (voltage/current) of the pulses differ between the light sources, which may be due to different forward voltages in different type color LEDs.

In the first driving scheme according to FIG. 8a, the pulse level is fixed per color. E.g. the red light source is always driven at the same, constant voltage. However, between two pulses for the red light source, one pulse for the green and one pulse for the blue light source needs to be delivered at a different voltage. Thus, with three light sources directly connected to the main power supply unit 12, the problem of voltage mismatch would occur at the end of a first and start of a second pulse, leading to non-exact pulse shape.

In order to implement the driving scheme of FIG. 8a for the light sources connected as loads to the power supply circuit 10 of FIG. 1, the circuit is operated in the following way:

Control unit 24 receives as input signal a "select" signal indicating which light source should currently be selected and as "level" signal information indicating the desired voltage level for that light source. The control unit selects the corresponding output unit by sending a first control signal switching on both the capacitor switch 40 and the load switch 38 of the output unit to be selected, and by sending a second control signal to the remaining output unit switching off both the load switch 38 and the capacitor switch 40. Further, the feedback signal from sensing circuit 22 is evaluated and control of the main switching element 26 is effected in such a way that the desired pulse level is reached.

Within the selected output unit, the switches 38, 40 are now set such that the output current $I_{out}$ of the main power supply unit 12 is directly supplied to load output 36, and thus to the light source connected there. Capacitor C is connected in parallel to the load and serves as a buffer reducing ripple of the output voltage.

In all driving schemes according to FIG. 8a as well as 8b and 8c which will later be explained, the pulse height at the end of each pulse is identical to the height at the start of the pulse. Thus, capacitor C will, at the end of the pulse, be charged to the corresponding voltage. After the end of the pulse, the corresponding output unit 20 is deactivated by switching off both the load switch 38 and the capacitor switch 40. Thus, capacitor C remains essentially charged at the previous voltage level. This is why at the start of the next pulse of that load, capacitor C will always be charged to the correct voltage level. Consequently, the reaction time of the switched mode converter 12 controlled by the control unit 24 in response to the feedback signal from sensing circuit 22 will not lead to a significant delay of a rise of the voltage delivered at the output 36. Instead, the pulse will be delivered in a very exact shape.

In the driving scheme of FIG. 8a, brightness and color control are effected by the length of the pulses. Due to the very exact shape of the actually delivered pulses, such control may be effected very exactly.

In the alternative driving scheme shown in FIG. 8b, pulse level modulation is used. Thus, brightness and color control are effected by modulating the pulse level. However, the pulse level is modulated only by changing the level in the center of the pulse, while the pulse level at the start and end remains at an equal, fixed value. As will be appreciated by the skilled person, the power supply circuit 10 described above is also applicable for the alternative driving scheme of FIG. 8b, because here also the capacitor C in each of the output units 20a, 20b, 20c will, at the start of each pulse, automatically be charged to the correct voltage level.

Figure 2:
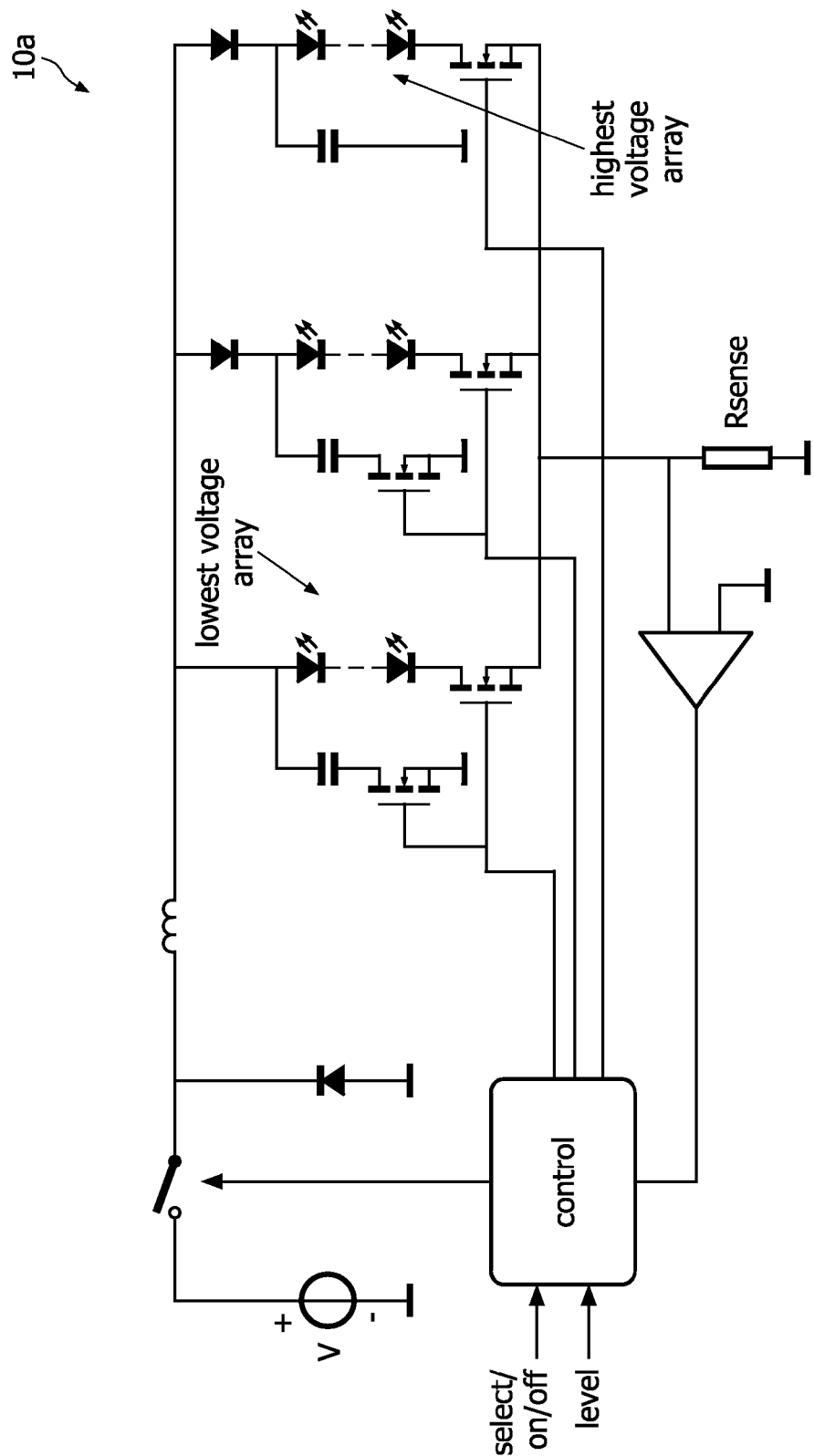
FIG. 2 shows a circuit diagram of a variant of the circuit according to the first embodiment of the invention.

FIG. 2 shows a power supply circuit 10a which is a variant of the above described first embodiment. In comparison with the first embodiment, the alternative circuit 10a does not comprise an auxiliary diode D1 for the first and a capacitor switch 40 for the third output unit.

If it is ensured according to the driving scheme that the voltage at the load output of the first output unit is always lower than at the remaining two outputs (e.g. the "red" output in the driving scheme according to FIG. 8a) and the output voltage level at the third output is always higher than the remaining two (e.g. "blue" in FIG. 8a), then the two mentioned elements may be omitted. The auxiliary diode D1 in each output unit serves to avoid conduction out of (instead of: into) the output unit if FET 38 is switched off (and then behaves like a diode). At the output unit with the lowest voltage, this problem does not occur and thus D1 may be omitted here. Also, the capacitor switch 40 serves to avoid any change of voltage (charge or discharge) at capacitor C if the output unit is deactivated. If it is ensured by the driving scheme that the capacitor C of the third output unit is already charged to a voltage level higher than the voltage over the remaining two output units, then the problem of charging does not occur, and also the problem of discharging does not occur while the corresponding output unit is deselected, because the load switch will be deactivated. Thus, the capacitor switch 40 may be omitted here also.

Figure 5:
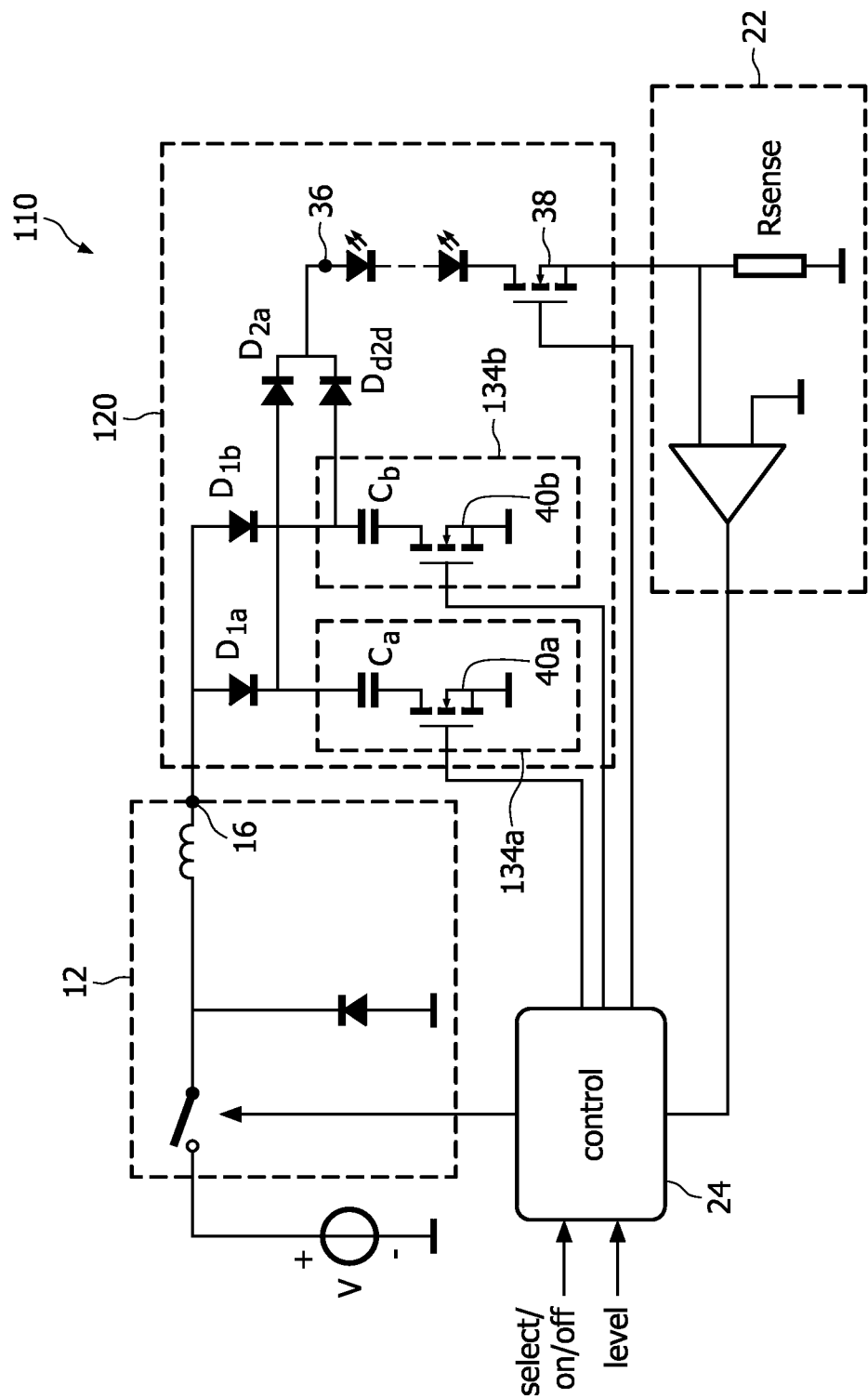
FIG. 5 shows as a forth embodiment of the invention a circuit diagram of a power supply circuit with a single multi-level output.

FIG. 5 shows a power supply circuit 110 which is an embodiment of the first aspect of the invention. As will be appreciated by the skilled person, the circuit 110 in large parts corresponds to the circuit 10 shown in FIG. 1 and discussed above. As in the first embodiment, the circuit 110 also comprises a main power supply unit 12, a control unit 24 and a sensing circuit 22. Thus, regarding these elements and their alternatives it is referred to the above description.

In contrast to the circuit 10 of FIG. 1, the circuit 110 of FIG. 5 only has one output unit 120 connected to the output 16 of the main power supply unit 12. The output unit 120 has a load output 36 to which an LED array is connected. A load switch 38 is connected in series to the load.

There are further provided two switched capacitor units 134a, 134b, which are each comprised of a series connection of a capacitor Ca, Cb and a capacitor switch 40a, 40b, implemented as an FET. The switched capacitor units 134a, 134b are each connected to the output 16 of the main power supply unit 12 via a first auxiliary diode D1a, D1b and to the load output 36 via a second auxiliary diode D2a, D2b.

In operation of the circuit 110, the capacitors Ca, Cb from the switched capacitor unit 134a, 134b serve to buffer the output voltage supplied at load output 36 selectively at different levels. The corresponding capacitor switches 40a, 40b are selectively controllable by control unit 24.

Again, load switch 38 serves to activate or deactivate the output unit 120 by connecting or disconnecting the output unit 120 to or from the main power supply unit 12.

In order to supply at load output 36 pulses at different voltage levels, load switch 38 is operated synchronously with either the first capacitor switch 40a or the second capacitor switch 40b. If the first capacitor switch 40a and the load switch 38 are closed, the first capacitor Ca is connected in parallel to the load. If the load switch 38 and the second capacitor switch 40b are closed, the second capacitor Cb is connected in parallel to the load.

During operation, the control unit 24 receives a control signal relating to on/off selection of output unit 120 as well as the desired output level. In accordance with this control information, load switch 38 is driven synchroneously with either the first capacitor switch 40a or the second capacitor switch 40b. Further, the main power supply unit 12 is controlled according to the feedback signal obtained from sensing circuit 22 according to the desired voltage level. Thus, during each pulse to be delivered, main power supply unit 12 is feedback-controlled to deliver a corresponding mean output current $I_{out}$ leading to the desired voltage at the load output. The currently selected capacitor Ca or Cb is charged to the corresponding voltage level and after deactivation of the load by load switch 38 remains essentially charged, because also capacitor switch 40a, 40b is opened. Due to buffering of the correct voltage level through capacitor Ca, Cb, the power supply 110 is able to supply voltage pulses selectively of two different voltage levels at load output 36 in a very exact manner.

There are a number of variations possible to the basic circuit shown in FIG. 5. As the skilled person will appreciate, it is possible to provide more than two switched capacitor units 134a, 134b if a larger number of different voltage levels is required at load output 36.

Figure 6:
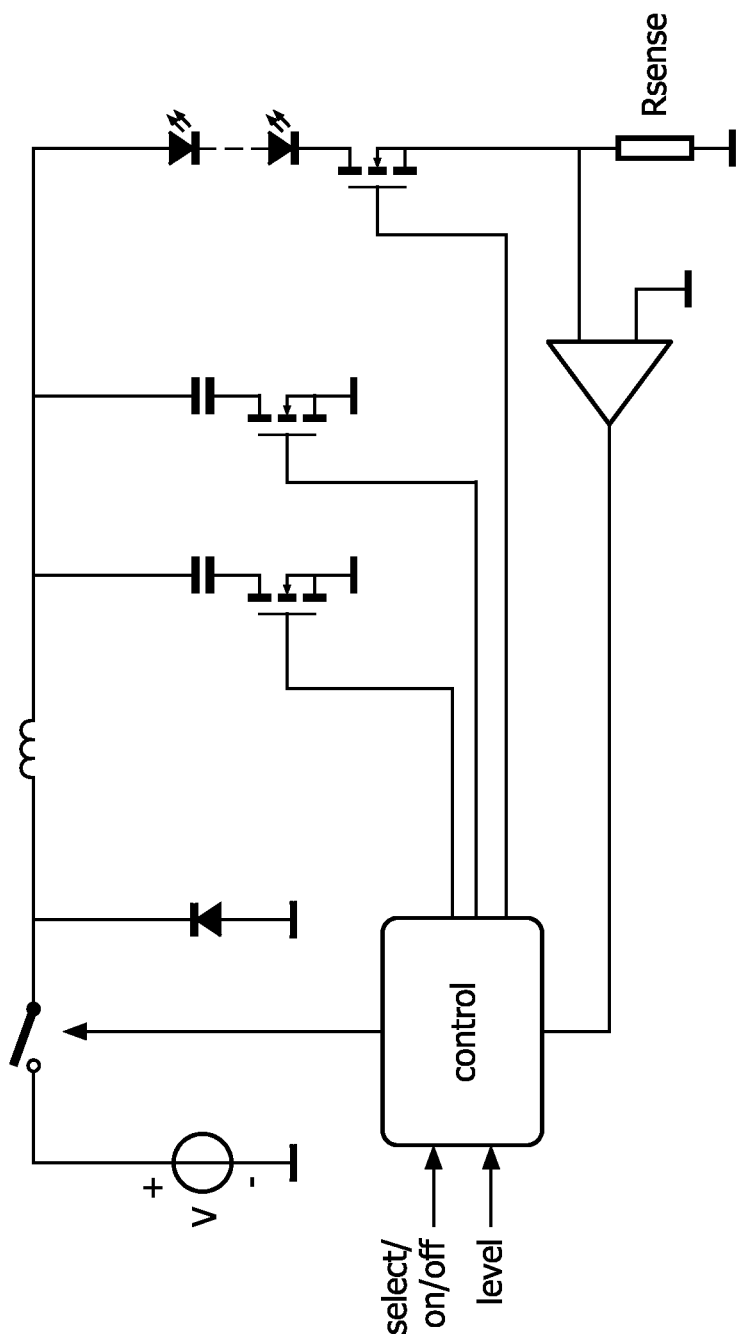
FIG. 6 shows a circuit diagram of a variant of the fourth embodiment according to FIG. 1.

As further shown in FIG. 6, auxiliary diodes D1a, D1b, D2a, D2b may also be omitted under certain circumstances. It should be appreciated that these diodes are provided because the FETs implementing the capacitor switches 40a, 40b are not ideal switches, but when opened behave as a diode. However, with carefully selected voltage levels at the two capacitors, which differ by no more than the forward voltage of the open FET acting as diodes, allow to omit the auxiliary diodes as shown in FIG. 6. It should be kept in mind that the current/ voltage characteristic of an LED load is quite steep, so that already small differences in the voltage level may lead to significantly different currents and consequently light output values.

Figure 7:
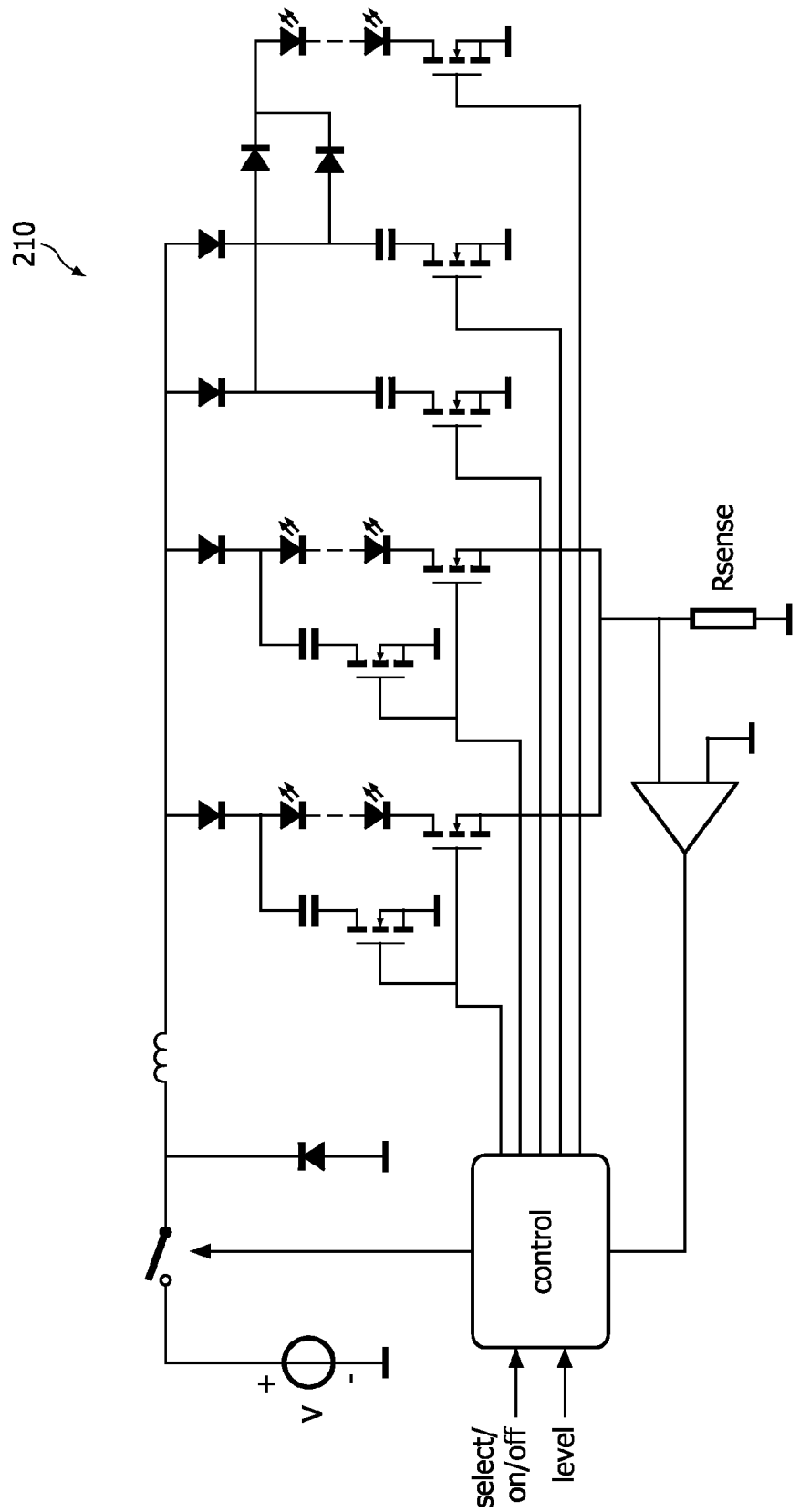
FIG. 7 shows as a fifth embodiment of the invention a circuit diagram of a power supply circuit with three load outputs, of which one supports two-level output.

As a further embodiment, FIG. 7 shows a power supply circuit 210 which combines the first and second aspect of the invention. Power supply circuit 210 in large parts corresponds to power supply circuit 10 as shown in FIG. 1 and discussed in connection therewith. However, power supply circuit 210 differs from the first embodiment in that the third output unit is a multi-level output unit as shown and described in connection with FIG. 5.

As will be appreciated by the skilled person by the combination of the above descriptions in relation to FIG. 1 and FIG. 5, the circuit 210 as shown in FIG. 7 may be used to implement a driving scheme as shown in FIG. 8c, where the green light source is connected to the third output unit. In this driving scheme, there is provided a sequence of pulses for red, green and blue. After the pulse for the blue light source, a further, higher level pulse is delivered again to the green light source. Then, the sequence starts over.

To implement a corresponding driving scheme, the control unit of the circuit 210 in FIG. 7 receives the corresponding information about selection of the output units and the required pulse height. In accordance with this information, the control unit selects the corresponding output unit as described above. For the third output unit, the control unit either selects the first switched capacitor unit for delivering the "green low" pulse or the second switched capacitor unit for delivering the "green high" pulse.

The invention has been illustrated and described in detail in the drawings and foregoing description. Such illustration and description are to be considered illustrative or exemplary and not restrictive; the invention is not limited to the disclosed embodiments.

In the claims, the word "comprising" does not exclude other elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A power supply circuit comprising:
   a main power supply unit comprising a voltage input, at least one main switching element, and at least one reactive element, wherein said switching element is controllable to deliver at least one of an output voltage and an output current; and
   an output unit connected to said main power supply unit, the output unit comprising:
      a load output,
      a load switching element connected in series to said load output and configured to operatively connect said load output to said main power supply unit,
      a first switched capacitor unit connectable to said load output and comprising a first capacitor and a first capacitor switching element configured to selectively connect the first capacitor in parallel with said load output and said load switching element, and
      a second switched capacitor unit connectable to said load output and comprising a second capacitor and a second capacitor switching element configured to selectively connect the second capacitor in parallel with said load output and said load switching element; and
   a control unit configured to select one of the first and second switched capacitor units, and to control the load switching element synchronously with one of the first capacitor switching element and the second capacitor switching element of the selected one of the first and second switched capacitor units to connect the corresponding one of the first capacitor and the second capacitor in parallel with said load output and said load switching element.

2. The power supply circuit according to claim 1, wherein said first switched capacitor unit comprises said first capacitor and said first capacitor switching element connected in series, and
   wherein said second switched capacitor unit comprises said second capacitor and said second capacitor switching element connected in series.

3. The power supply circuit according to claim 1, wherein said first and second switched capacitor units are connected to said main power supply unit in parallel with said load output and said load switching element.

4. The power supply circuit according to claim 1, further comprising:
   control means configured to control said at least one main switching element, said load switching element and said first and second capacitor switching elements
   wherein said at least one main switching element, said load switching element and said first and second capacitor switching elements are controlled such that said first and said second capacitors remain essentially charged to different voltage levels.

5. The power supply circuit according to claim 4, wherein said at least one main switching element, said load switching element and said first and second capacitor switching elements are controlled according to a required load output voltage level, such that if a first output voltage level is required, said first capacitor switching element is activated such that said first capacitor is connected in parallel to said load output, and if a second output voltage level is required, said second capacitor switching element is activated such that said second capacitor is connected in parallel to said load output.

6. The power supply circuit according to claim 1, wherein the output load is supplied pulses at a first voltage level when the first capacitor switching element connects the first capacitor in parallel with said load output and said load switching element, and at a second voltage level when the second capacitor switching element connects the second capacitor in parallel with said load output and said load switching element, the second voltage level being different from the first voltage level.

7. The power supply circuit according to claim 1, wherein said load output is connected to a load, and said load switching element is connected in series with the load.

8. The power supply circuit according to claim 1, wherein the load comprises a plurality of LEDs.

* * * * *